(12) United States Patent
Tang et al.

(10) Patent No.: US 7,868,747 B2
(45) Date of Patent: Jan. 11, 2011

(54) VEHICLE REVERSING ALARM HAVING ULTRASONIC AND CAMERA SENSORS

(75) Inventors: Wenhai Tang, Guangzhou (CN); Jun Luo, Guangzhou (CN); Desheng Li, Guangzhou (CN)

(73) Assignee: Weiwen Yan, Guandong Province (CN)

( * ) Notice: Subject to any disclaimer, the term of this patent is extended or adjusted under 35 U.S.C. 154(b) by 337 days.

(21) Appl. No.: 12/168,391

(22) Filed: Jul. 7, 2008

(65) Prior Publication Data

US 2009/0174535 A1 Jul. 9, 2009

(30) Foreign Application Priority Data

Jan. 8, 2008 (CN) .................... 2008 2 0042726 U

(51) Int. Cl.
*B60Q 1/00* (2006.01)
(52) U.S. Cl. .................................... 340/435; 340/693.5
(58) Field of Classification Search ......... 340/435–438, 340/693.5, 901, 903, 904; 307/901; 180/271; 367/112, 909
See application file for complete search history.

(56) References Cited

U.S. PATENT DOCUMENTS

D411,499 S * 6/1999 Porter ...................... D12/193
6,720,868 B2 * 4/2004 Flick .......................... 340/435

* cited by examiner

*Primary Examiner*—Jeffery Hofsass
(74) *Attorney, Agent, or Firm*—The Webb Law Firm

(57) ABSTRACT

The vehicle reversing radar alarm of this invention pertains to the field of alarming device and particularly relates to a vehicle reversing radar alarm for cars. The vehicle reversing radar alarm consists of a frame mount, a camera assembly, a support means for camera, mounting holes for ultrasonic sensors, a circuit board and a rear cover. The ultrasonic sensors are mounted into the mounting holes for ultrasonic sensors arranged on the frame mount. The camera assembly is mounted into the mounting holes for camera assembly arranged on the frame mount. The support means for camera covers the camera assembly and is fixed on the frame mount by screws. There are rotation axes at both ends of the camera assembly and the camera assembly can rotate together with the rotation axes. This invention has a simple structure and a reasonable design, and it is easy to mount it and convenient to use it.

6 Claims, 2 Drawing Sheets

VEHICLE REVERSING ALARM HAVING ULTRASONIC AND CAMERA SENSORS

FIELD OF THE INVENTION

The vehicle reversing radar alarm of this invention pertains to the field of alarm device and particularly relates to a vehicle reversing radar alarm for cars.

BACKGROUND OF THE INVENTION

All the reversing radars now used for the cars are mounted with special devices by the professionals. They are mounted at a rear bumper of a vehicle. Generally, when they are mounted, they are embedded and an opening has to be made at the mounting place. Furthermore, they can only be mounted correctly and quickly under the professional instructions. In this way, the former car body is destroyed and also, it is difficult to mount the radar. The requirements on the professionals and devices for mounting radars are very high, the orientation is fixed and it is inconvenient to mount them. An ultrasonic sensor and a camera adopted by a vehicle reversing radar need to be arranged and matched reasonably and the mounting angle and position of the camera will influence the use effects of the vehicle reversing radar alarm. In another aspect, the mounting angle of the camera is required to change due to different roads conditions; otherwise, thereby the safety for vehicle reversing is influenced directly.

SUMMARY OF THE INVENTION

The purpose of this invention is to avoid the disadvantages of the prior art and to provide a vehicle reversing radar alarm which is easily installed and can adjust the mounting angle of its camera.

The purpose of this invention is realized by the following technical solutions: the vehicle reversing radar alarm of this invention consists of a frame mount, a camera assembly, a support means for camera, rubber mats, mounting holes for ultrasonic sensors, a circuit board, a waterproof rubber sheet and a rear cover. A fixed mounting hole is arranged on the outer shell of the frame mount and a mounting hole for camera assembly and mounting holes for ultrasonic sensors are arranged on the frame mount. A circuit board is mounted on the back of the frame mount, and it is used to process the ultrasonic transmission signals. A waterproof rubber sheet covers on the circuit board. The rear cover is fixed on the back of the frame mount. The ultrasonic sensors are mounted into the corresponding mounting holes arranged on the frame mount. The camera assembly is mounted into the corresponding mounting holes arranged on the frame mount. The support means for camera covers the camera assembly and is fixed on the frame mount by screws. There are rotation axes at both ends of the camera assembly and the camera assembly can rotate together with rotation axes to adjust the mounting angle of the camera.

The mounting hole for camera assembly on the frame mount is a groove. At both ends of the groove, there are half round slots for placing the rotation axes at both ends of the camera assembly and the rotation axes at both ends of the camera assembly are mounted in the half round slots. On the support means for camera, there are half round slots for placing the rotation axes at both ends of the camera assembly and the support means for camera covers the camera assembly.

There are pits arranged at both sides of the camera assembly and there are screw holes arranged at both sides of the support means for camera. The ball screws are mounted in the screw holes arranged at both sides of the support means for camera and they are corresponding to the pits arranged at both sides of the camera assembly. When the camera assembly rotates, the ball screw matches with the pit and the obvious shift difference is formed.

The ball screw may use ball and spring, which are installed in the screw holes arranged at both sides of the support means for camera.

A rubber mat is arranged on the support means for camera and it is placed between the camera assembly and the support means for camera.

This invention has a simple structure and a reasonable design, and it is easy to mount it and convenient to use it.

DETAILED DESCRIPTION OF THE PREFERRED EMBODIMENT

The present invention will be further explained with reference to the accompanying drawings.

Figure 1:
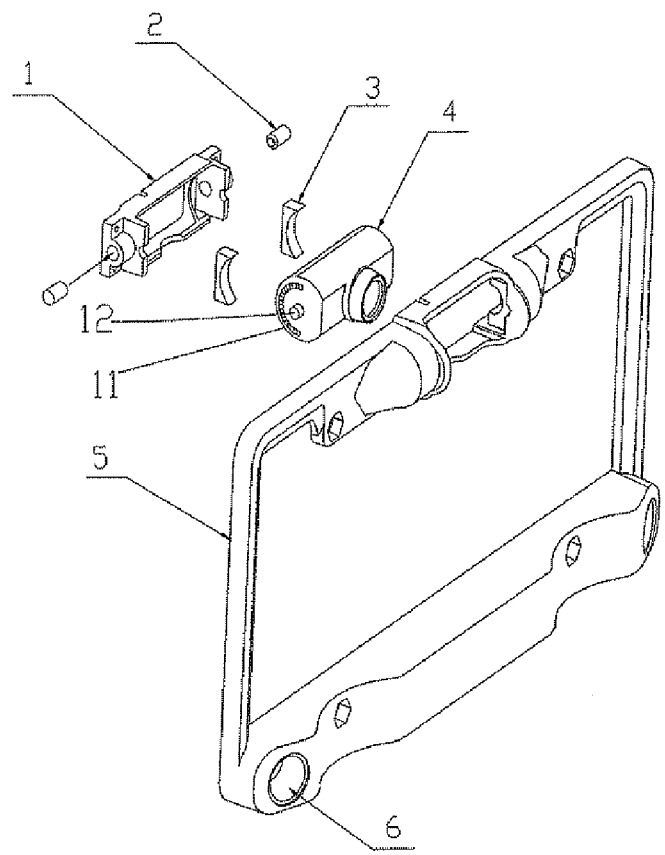
FIG. 1 is a structural diagram of the embodiment of the present invention.
Figure 2:
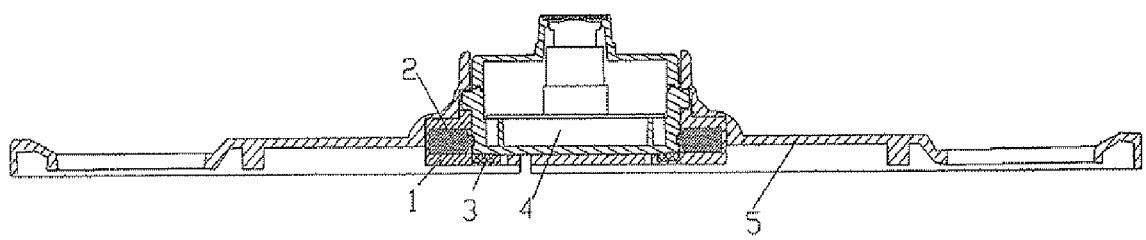
FIG. 2 is a structural diagram of the embodiment of the present invention.
Figure 3:
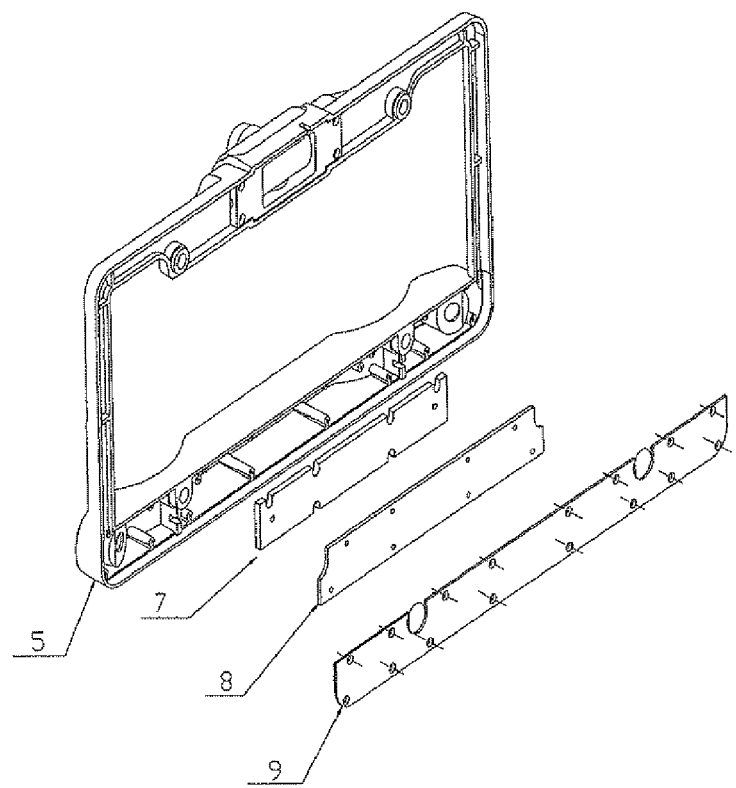
FIG. 3 is a structural diagram of the embodiment of the present invention.
Figure 4:
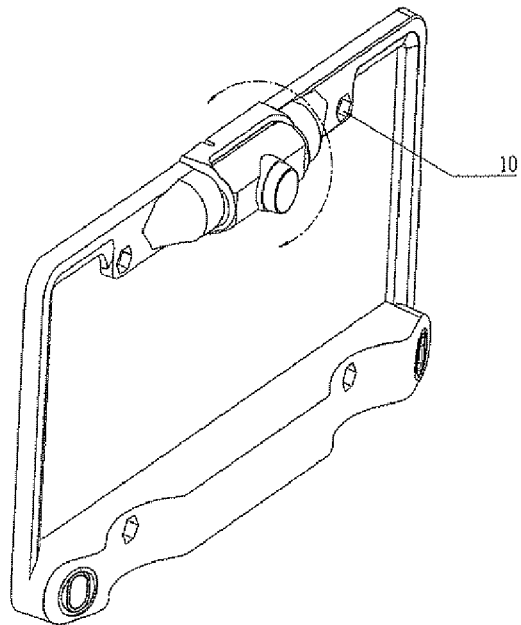
FIG. 4 is a structural diagram of the embodiment of the present invention.

As shown in FIG. 1, FIG. 2, FIGS. 3 and FIG. 4, the vehicle reversing radar alarm of the present invention comprises a frame mount 5, a camera assembly 4, a support means for camera 1, ball screw 2, rubber mat 3, mounting hole for ultrasonic sensor 6, a circuit board 7, a waterproof rubber sheet 8 and a rear cover 9. A fixed mounting hole 10 is arranged on the outer shell of the frame mount for fixing the vehicle reversing radar alarm onto the outer frame of the car plate. A mounting hole for camera assembly is arranged on the upper-middle part of the frame mount and two mounting holes for ultrasonic sensors are arranged on the lower part of the frame mount. The ultrasonic sensors are mounted into the mounting holes for ultrasonic sensors. A circuit board is mounted on the back of the frame mount for processing the ultrasonic transmission signals. The circuit board 7 for processing ultrasonic transmission signals is installed in the middle frame at the lower part of the frame mount 5. A waterproof rubber sheet 8 covers on the circuit board. The rear cover 9 is fixed on the back of the frame mount. The waterproof rubber sheet 8 and the rear cover 9 achieve the waterproofing purpose. The camera assembly is mounted into the mounting holes for camera assembly arranged on the frame mount. There are rotation axes 12 at both ends of the camera assembly. The mounting hole for camera assembly on the frame mount is a groove. At both ends of the groove, there are half round slots for placing the rotation axes at both ends of the camera assembly and the rotation axes 12 at both ends of the camera assembly are mounted in the half round slots. The support means for camera covers the camera assembly and the support means for camera is fixed on the frame mount by screws. There are pits 11 arranged at both sides of the camera assembly and there are screw holes arranged at both sides of the support means for camera. The ball screws 2 are mounted in the screw holes arranged at both sides of the support means for camera and they are corresponding to the pits arranged at both sides of the camera assembly. When the camera assembly rotates, the ball screw matches with the pit and the obvious shift difference is formed. The camera assembly mounted on the frame mount can rotate up and down by 180 degrees and an obvious shift difference is formed under the action of ball screw. Each shift is 10°. A rubber mat is arranged on the support means for camera and it is placed between the camera assembly and the support means for camera. One side of the rubber mat is arc-shaped and the arc matches with the outer shell of the camera assembly.

The invention claimed is:

1. A vehicle reversing radar alarm, comprising:
a frame mount,
a camera assembly,
a camera support means,
mounting holes for ultrasonic sensors,
a circuit board, and
a rear cover,
wherein a fixed mounting hole is arranged on an outer shell of the frame mount and a mounting hole for the camera assembly and the mounting holes for ultrasonic sensors are arranged on the frame mount, the circuit board is mounted on the back of the frame mount for processing the ultrasonic transmission signals, the rear cover is fixed on the back of the frame mount, the ultrasonic sensors are mounted into the mounting holes for ultrasonic sensors arranged on the frame mount, the camera assembly is mounted into the mounting hole for the camera assembly arranged on the frame mount, and wherein said camera support means covers the camera assembly with rotation axes at both ends of the camera assembly.

2. The vehicle reversing radar alarm as claimed in claim 1, wherein the mounting hole for the camera assembly on the frame mount is a groove having half round slots for placing the rotation axes at both ends of the camera assembly at both ends of the groove.

3. The vehicle reversing radar alarm as claimed in claim 1, wherein pits are arranged at both sides of the camera assembly and screw holes are arranged at both sides of the camera support means, wherein ball screws are mounted in the screw holes arranged at both sides of the support means for camera.

4. The vehicle reversing radar alarm as claimed in claim 1, further comprising a rubber mat arranged on the camera support means, the rubber mat being placed between the camera assembly and the camera support means.

5. The vehicle reversing radar alarm as claimed in claim 1, wherein the camera support means comprises half round slots for placing the rotation axes at both ends of the camera assembly.

6. The vehicle reversing radar alarm as claimed in claim 2, wherein the camera support means comprises half round slots for placing the rotation axes at both ends of the camera assembly.

* * * * *